April 28, 1959  C. M. FINIGAN ET AL  2,884,474
ANTI-FOAM AGENTS IN SEPARATION OF OLEFINES FROM SOLVENT
Filed April 23, 1956
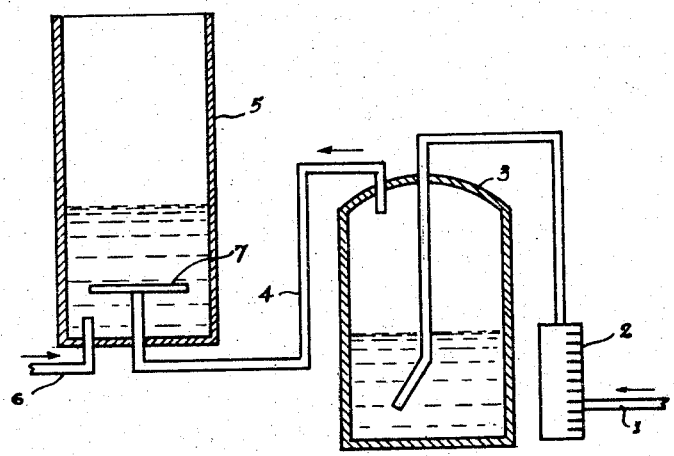
Inventors,
Charles M. Finigan
John P. Speher
by Stevens, Davis, Miller & Mosher
their attorneys

United States Patent Office

2,884,474
Patented Apr. 28, 1959

2,884,474

ANTI-FOAM AGENTS IN SEPARATION OF OLEFINES FROM SOLVENT

Charles M. Finigan and John Phillip Spehar, Sarnia, Ontario, Canada, assignors to Polymer Corporation Limited, Sarnia, Ontario, Canada, a corporation of Canada Application April 23, 1956, Serial No. 579,794

12 Claims. (Cl. 260—681.5)

This invention relates to anti-foam agents. More particularly, it relates to certain anti-foam agents particularly suited for breaking foam in a specific industrial application.

It is now well known that butadiene-1,3 is an especially valuable commercial chemical since it can be polymerized, either alone or together with other materials to form a variety of polymeric materials; an example is the copolymerization of butadiene-1,3 and styrene to form a synthetic rubber known as GR–S. Butadiene-1,3 may be conveniently formed by the dehydrogenation of n-butylene using, for example, a calcium nickel phosphate catalyst, of the type disclosed in U. S. Patent 2,442,320, issued May 25, 1948, to Andrew J. Dietzler et al., in the presence of steam. The product of the dehydrogenation usually contains about 18 to 25 weight percent butadiene-1,3, with the remainder being n-butylene and other hydrocarbons. In order to obtain substantially pure butadiene-1,3 for use as a polymerizable monomer, it is therefore necessary to separate the butadiene-1,3 from the contaminants.

One satisfactory method of separating olefinic hydrocarbons containing at least four carbons in the olefinic chain, for example, butadiene-1,3, is by thoroughly mixing the hydrocarbon stream with a solvent selective for such olefinic hydrocarbon and then passing the mixture to a settler where the hydrocarbon-rich solvent separates from the other hydrocarbons. Suitable solvents include those which are ammoniacal solutions of copper ions with an anion capable of forming cuprous salts soluble in such solvent. Examples of such anions include formate, acetate, maleate, sulfate, chloride, etc. The solutions may be aqueous or aqueous alcoholic solutions of methanol, ethanol or propanol. An example of such solvent is aqueous copper ammonium acetate. A series of such mixer-settlers may be used in which case solvent passes in one direction and the hydrocarbon stream passes in the opposite direction. After passage through such a series of mixer-settlers the solvent stream is enriched in the olefinic hydrocarbon and is relatively free of other hydrocarbons. Before it can be used, the olefinic hydrocarbon must be separated from the solvent and this is usually done by heating the rich solvent in a desorption column where the olefinic hydrocarbon is removed in vapour form.

It is found that, in the desorption step for the removal of butadiene-1,3 from an ammoniacal copper ion solvent, excessive foaming, which hampers the efficiency of the process, is frequently encountered.

It is therefore an object of the present invention to disclose a compatible anti-foaming agent to be used in the above described desorption step.

It is a further object of the present invention to disclose an anti-foam agent which both prevents formation of foam and disperses foam already present in the ammoniacal copper ion solvent when the butadiene-1,3 therein is driven off in a desorber tower.

These and other objects are attained, according to the present invention, in the process of preferentially expelling, by heat, the olefinic hydrocarbon having at least four carbon atoms in the olefinic chain dissolved in a solvent consisting of an ammoniacal solution of copper ions with an anion capable of forming cuprous salts soluble in such ammoniacal solution which comprises inhibiting foam during said preferential expulsion by the addition to said olefin-containing solvent, of a non-ionic surface active ester of a fatty acid containing 12–18 carbon atoms. Particularly, it envisages the process of preferentially expelling, by heat, the butadiene-1,3 dissolved in a copper ammonium acetate solvent which comprises inhibiting foam during said preferential expulsion by the addition to said olefin-containing solvent, of a non-ionic surface active ester of a fatty acid containing 12–18 carbon atoms.

In this specification the terms, anionic, non-ionic and cationic are used in their accepted meanings. Thus, the anionic compounds are those which are ionized in solution with the acive portion of the molecule being negatively charged and moving in solution towards the anode. The anionics consist principally of the sulfated and sulfonated compounds which can be subdivided into the following categories: alkyl-aryl sulfonates; alkyl sulfates; sulfated and sulfonated amines and amides; sulfated and sulfonated esters and ethers; alkyl sulfonates; and miscellaneous types.

The cationic compounds are those in which the active part of the molecule is positively charged and hence moves in solutions towards the cathode. The cationics generally are weak in detergent power but mainly have strong lubricating and germicidal properties. They fall into two main classes: acid neutralized tertiary amine salts; and quaternary ammonia compounds.

Those compounds which do not ionize in solution are known as non-ionics. They are generally insoluble in water and are chiefly emulsifying agents. The two main types are esters and ethers, the ether sometimes being present in a group of polyalcohols on ethylene oxide. The hydrophilic part of the chain may be an acid, alcohol, phenol, amide or amine.

In the testing of various agents for anti-foam activity under conditions similar to actual operating conditions, the following procedure was used:

Four hundred mls. of copper ammonium acetate solvent, containing dissolved butadiene was introduced into a calibrated tube. Butadiene-1,3, saturated with ammonia, was then passed through a fritted glass disc and into the copper ammonium acetate solvent at a rate sufficient to produce a 1000 cc. column of foam. Then, without varying the flow of the butadiene-1,3, one drop of the anti-foam agent under test, approximately 100 p.p.m. was introduced at the top of the column. The effectiveness of the agent was based on the rate of foam destruction, with the time recorded for the half and complete foam destruction. The results for 81 compounds are given in Table I, below. The name in brackets indicates the manufacturer of the trade named product.

The apparatus used in the determination is shown in somewhat diagrammatic form in the drawing.

Butadiene-1,3, which is drawn from the conventional butadiene-1,3 extraction unit hereinbefore described and hence is the actual commercial butadiene-1,3, is led into the system via inlet 1 which is connected to a flow meter 2. The butadiene-1,3 then leaves the flow meter at a known rate and passes into bubbler 3, which contains concentrated ammonium hydroxide. Thus, the butadiene-1,3 leaving the bubbler through outlet 4 is saturated with ammonia. The butadiene-1,3 then enters vessel 5, containing copper ammonium acetate solvent which enters by inlet 6, through a sintered glass disc 7. Thus, as the butadiene-1,3 enters the copper ammonium acetate solvent, a foam is formed.

TABLE I

*Effects of anti-foam agents on copper ammonium acetate-hydrocarbon foam*

I. ANIONIC

| No. | Trade Name | Chemical Name | Time of Foam Destruction (Seconds) Half | Time of Foam Destruction (Seconds) Complete | Remarks |
|---|---|---|---|---|---|
| (A) ALKYL ARYL SULFONATES |||||| 
| 1 | Acto 450 (Esso Standard Oil Co.) | An alkyl aryl sulfonate | 40 | >180 | precipitate formed. |
| 2 | Aerosol OS (American Cyanimid) | Isopropyl naphthalene sodium sulfonate | | | excess to break foam. |
| 3 | Ahcowet ANS (Arnold, Hoffman and Co. Inc.) | Sodium alkyl naphthalene sulfonate | 7 | >180 | poor. |
| 4 | Alkanol WXN (Du Pont) | Sodium Alkaryl sulfonate | 5 | >180 | precipitate formed. |
| 5 | Alrosperse 40 K (Alrose Chemical Co.) | Alkyl naphthalene sodium sulfonate | | | ineffective. |
| 6 | Arkolene GN (Arkansas Co.) | Ammonium Alkyl aryl sulfonate | 25 | 180 | poor, precipitate formed. |
| 7 | Dianol 11 (Quaker Chemical Products Corp.) | Alkyl aryl Sulfonate | | | ineffective. |
| 8 | Merpentine (Du Pont) | Modified alkyl naphthalene sulfonate | 12 | 170 | foamed. |
| 9 | Morcowet 469 (Morton-Withers Chemical Co.) | Alkyl naphthalene sulfonate | 5 | 170 | Do. |
| 10 | Neomerpin N (Du Pont) | Alkylated Naphthalene sulfonic acid | | | ineffective. |
| 11 | Neomerpin (Du Pont) | Derivative of alkyl naphthalene sulfonate | 10 | >180 | poor, foamed. |
| 12 | Novonacco (National Aniline of Allied Chemical) | Modified sodium alkyl naphthalene sulfonate. | 5 | >180 | excess required to complete. |
| 13 | Santomerse 30 X (Monsanto) | Alkyl aryl sodium sulfonate | 7 | >180 | foamed. |
| 14 | Santomerse 3 (Monsanto) | Alkyl aryl sodium sulfonate | 9 | >180 | Do. |
| 15 | Sulframin N (Ultra Chemical Works) | Sodium salt of dialkylnaphthalene sulfonic acid. | | | ineffective. |
| 16 | Sulframin KE (Ultra Chemical Works) | Alkyl Aryl sulfonate | | | Do. |
| 17 | Titazole SA (Titan Chemical Products Inc.) | Sodium alkyl naphthalene sulfonate | 7 | >180 | foamed. |
| (B) ALKYL SULFATES |||||| 
| 18 | Avitex AD (Du Pont) | Sulfated alcohol derivative | 45 | 180 | poor. |
| 19 | Alrosene 15W (Alrose Chemical Co.) | Salt of a secondary alcohol sulfate | 3 | 10 | foamed. |
| 20 | Duponol D (Du Pont) | Mixed alcohol sodium sulfate | 5 | 30 | |
| 21 | Merpol C (Du Pont) | Fatty alcohol sodium sulfate plus solvent | 6 | >180 | excess required to break foam. |
| 22 | Sulframin DR (Ultra Chemical Works) | Sodium Salt of an hydroxyl alkyl amide alcohol sulfate. | 2 | 5 | |
| (C) SULFONATED AND SULFATES AMIDES AND AMINES |||||| 
| 23 | Alrosol B (Alrose Chemical Co.) | Fatty alcohol amide condensate | 5 | >180 | foamed. |
| 24 | Duponol OS (Du Pont) | Fatty alcohol amine sulfate composition | 7 | 22 | Some precipitate formed with excess. |
| 25 | Igepon CN-42 (General Dyestuff Corp.) | Sodium-N-cyclohexyl-N-palmitoyl laurate | 9 | 15 | excess foams. |
| 26 | Mirapon RK Conc. (Miranol Chemical Co.) | Sulfonated fatty acid amide derivative | 12 | 180 | Do. |
| 27 | Sequestrene A A (Alrose Chemical Co.) | Tetra ammonium salt of ethylene diamine tetraacetic acid. | | | ineffective. |
| (D) SULFONATED AND SULFATED ESTERS AND ETHERS |||||| 
| 28 | Aerosol AY (American Cyanamid) | Diamyl ester of sulfosuccinic acid | | | excess to break foam. |
| 29 | Aerosol MA (American Cyanamid) | Dihexyl ester of sodium sulfosuccinic acid | | | Do. |
| 30 | Aerosol OT (American Cyanamid) | Dioctyl ester of sodium sulfosuccinic acid | | | Do. |
| 31 | Carbase Emulsifier (Carlisle Chemical Works, Inc.) | A sulfonated petroleum base with added emulsifier. | 25 | >180 | Do. |
| 32 | Dynesol F20 (Amalgamated Chemical Corp.) | Sulfonated polyester of an aliphatic alcohol | | | ineffective. |
| 33 | Nopco 2031 (Nopco Chemicals) | Sulfated hydroxy stearic acid | | | foams. |
| (E) ALKYL SULFONATES |||||| 
| 34 | Compound 8-S (Johnson-March Corp.) | Sodium salt of condensed alkyl sulfonic acid. | | | foams. |
| 35 | Petrowet R (Du Pont) | Aliphatic hydrocarbon sodium sulfonate | 3 | 15 | precipitate formed. |
| (F) MISCELLANEOUS TYPES |||||| 
| 36 | Aresklene 375 (Monsanto) | Dibutyl phenol sodium disulfonate | | | ineffective. |
| 37 | Arkolene WX (Arkansas Co.) | Sodium alkyl aryl sulfonate plus polyglycol. | 4 | >180 | foam and precipitate formed. |
| 38 | Lomar PW (Jaques Wolf & Co.) | Sodium salt of condensed naphthelene sulfonate. | | | foams. |
| 39 | Nekal NF (General Dyestuff Corp.) | Sodium alkyl naphthalene sulfonate | | | ineffective. |

TABLE I—Continued

*Effect of anti-foam agents on copper ammonium acetate-hydrocarbon foam*

| No. | Trade Name | Chemical Name | Time of Foam Destruction (Seconds) | | Remarks |
|---|---|---|---|---|---|
| | | | Half | Complete | |
| II. CATIONICS | | | | | |
| 40 | Alkaterge C (Commercial Solvents Corp.) | A substituted oxazoline | 50 | >180 | |
| 41 | Amine O (Lucidol Div., Novadel-Agene Corp.) | heterocyclic tertiary amine | 3 | 45 | |
| 42 | Ethomeen S-10 (Armour & Co.) | Tertiary amine | | | foams. |
| 43 | Ninol 737 (Ninol Laboratories) | Mixed fatty acid alkanol amine | | | promotes foam. |
| 44 | Quatronyx (Onyx Oil and Chemical Co.) | Quaternary ammonium compound | | | foams. |
| III. NONIONICS | | | | | |
| 45 | Emulphor EL-719 (General Dyestuff Corp.) | Polyoxyethylated vegetable oil | 3 | 11 | good. |
| 46 | Emulphor N-430 (General Dyestuff Corp.) | Polyoxyethylated fatty acid | 7 | 20 | Do. |
| 47 | Emulsifier 610A (General Dyestuff Corp.) | Polymerized higher glycol fatty acid ester | 3 | >180 | excess to break foam. |
| 48 | Nonisol 100 (Alrose Chemical Co.) | A polyethylene glycol of lauric acid | 5 | 20 | good. |
| 49 | Nonisol 300 (Alrose Chemical Co.) | Polyethylene glycol (M.W. 400) ester of stearic acid | 1 | 2 | Do. |
| 50 | Span 20 (Atlas Powder Co.) | Sorbitan monolaurate | 2 | 15 | Do. |
| 51 | Span 80 (Atlas Powder Co.) | Sorbitan oleate | 10 | 40 | Do. |
| 52 | Span 85 (Atlas Powder Co.) | Sorbitan trioleate | 8 | 25 | Do. |
| 53 | Tween 20 (Atlas Powder Co.) | polyoxyethylene sorbitan monolaurate | 5 | 17 | Do. |
| 54 | Tween 40 (Atlas Powder Co.) | polyoxyethylene sorbitan monopalmitate | 10 | >180 | fair. |
| 55 | Tween 60 (Atlas Powder Co.) | polyoxyethylene sorbitan monostearate | 10 | 25 | good. |
| IV. SILICONES | | | | | |
| 56 | Dow Corning Anti-foam A | A silicone | 18 | >180 | unsatisfactory. |
| 57 | Dow Corning Fluid 200 | do | 70 | >360 | Do. |
| 58 | Linde Silicone X-520 | do | | | Do. |
| 59 | G.E. Anti-foam | do | 25 | 180 | Do. |
| V. MISCELLANEOUS | | | | | |
| 60 | Aero Anti-foam H (American Cyanamid) | ? | 75 | >360 | unsatisfactory. |
| 61 | Atlas CRL #32334 G 656 | ? | 15 | 75 | fair. |
| 62 | Atlas CRL #32335 G 660 | ? | 15 | 180 | unsatisfactory. |
| 63 | Chel 330 (Alrose Chemical Co.) | salt of ethylene diamine tetra-acetic acid | no effect | | |
| 64 | Chel 153A (Alrose Chemical Co.) | do | no effect | | |
| 65 | Flux Oil | petroleum oil | 22 | >180 | unsuitable. |
| 66 | Hercules Defoamer 4 (Hercules Powder Co.) | ? | 7 | 75 | fair. |
| 67 | Nalco X285 (National Aluminate Corp.) | ? | 3 | 120 | Do. |
| 68 | Nil | Diglycol laurate | 7 | 20 | good. |
| 69 | Nil | Diglycol oleate | 7 | 20 | Do. |
| 70 | Nil | Glycerol monoricinoleate | 22 | 90 | fair. |
| 71 | Nil | Naphthenic acid | 1 | 2 | forms a precipitate. |
| 72 | Nil | Polyethylene glycol (M.W. about 400) | no effect | | |
| 73 | Nil | Polyglycol | 25 | 180 | unsatisfactory. |

It is seen from the above table that only a limited number of agents are suitable for use as anti-foam agents in the system containing aqueous copper ammonium acetate and butadiene-1,3. These agents may be classified broadly as non-ionic surface active esters of a fatty acid containing 12–18 carbon atoms.

In the tests described above, it is seen that only a representative group of compounds from each class was chosen for test purposes. As a general rule, a compound was considered unsatisfactory if any or all of the following events occurred: (1) the foam breakage was negligible or slow; (2) a precipitate or scum was formed when the compound was added to the system; (3) an excess of the agent under test produced its own foam. The agents which were considered suitable are listed separately below in Table II.

TABLE II

*Effective anti-foam agents*

| | Trade Name | Chemical Name | Class |
|---|---|---|---|
| 1 | Emulphor EL-719 | Polyoxyethylated vegetable oil | non-ionic. |
| 2 | Emulphor N-430 | Polyoxyethylated fatty acid | Do. |
| 3 | Nonisol 100 | Polyethylene glycol of lauric acid | Do. |
| 4 | Nonisol 300 | polyoxyethylene glycol (M.W. 400) ester of stearic acid | Do. |
| 5 | Span 20 | Sorbitan monolaurate | Do. |
| 6 | Span 80 | Sorbitan oleate | Do. |
| 7 | Span 85 | Sorbitan trioleate | Do. |
| 8 | Tween 20 | Polyoxyethylene sorbitan monolaurate | Do. |
| 9 | Tween 40 | Polyoxyethylene sorbitan monopalmitate | Do. |
| 10 | Tween 60 | Polyoxyethylene sorbitan monostearate | Do. |

While it is not desired to be limited to or by any particular theory, it is believed that there may be some correlation between the chemical structure of the effective anti-foaming agents and the copper ammonium acetate solvent. Most of the compounds contain fatty acid groupings which correspond to the acetate grouping in the solvent and/or amine groupings corresponding to the ammonia in the solvents. Thus the silicons and the glycols are ineffective anti-foam agents in the present case.

What we claim is:

1. In the process of expelling, by heat, an olefinic hydrocarbon having at least 4 carbon atoms in the olefinic chain, said hydrocarbon being dissolved in a solvent comprising an ammoniacal solution of copper ions with an anion capable of forming cuprous salts soluble in said ammoniacal solution, the olefinic hydrocarbon being recovered in vaporized state to leave a stripped solvent and the stripped solvent being recovered in liquid state, said stripped solvent having dissolved therein foam producing materials, the improvement which comprises inhibiting foam during said expulsion by the addition, to said olefin-containing solvent, of a non-ionic surface active ester of a fatty acid containing 12–18 carbon atoms.

2. In the process of expelling, by heat, the butadiene-1,3 dissolved in an aqueous copper ammonium acetate solvent the butadiene-1,3 being recovered in a liquid state to leave a stripped solvent, said stripped solvent having dissolved therein foam producing materials, the improvement which comprises inhibiting foam during said expulsion by the addition, to said butadiene-1,3-containing solvent, of a non-ionic surface active agent ester of a fatty acid containing 12–18 carbon atoms.

3. The process of claim 2 wherein the non-ionic surface active agent is a sorbitan ester of a fatty acid containing 12–18 carbon atoms.

4. The process as claimed in claim 2 wherein the non-ionic surface active agent is a polyglycol ester of a fatty acid containing 12–18 carbon atoms.

5. The process of claim 2 wherein the non-ionic surface active agent is a polyoxyethylated vegetable oil in which the polyoxyethylene has a maximum molecular weight of about 400.

6. The process of claim 2 wherein the non-ionic surface active agent is polyoxyethylene glycol ester of stearic acid in which the polyoxyethylene has a maximum molecular weight of about 400.

7. The process of claim 2 wherein the non-ionic surface active agent is sorbitan monolaurate.

8. The process as claimed in claim 2 wherein the non-ionic surface active agent is a sorbitan oleate.

9. The process as claimed in claim 2 wherein the non-ionic surface active agent is sorbitan trioleate.

10. The process as claimed in claim 2 wherein the non-ionic surface active agent is polyoxyethylene sorbitan monolaurate wherein the polyoxyethylene has a maximum molecular weight of about 400.

11. The process as claimed in claim 2 wherein the non-ionic surface active agent is polyoxyethylene sorbitan monopalmitate in which the polyoxyethylene has a maximum molecular weight of about 400.

12. The process as claimed in claim 2 wherein the non-ionic surface active agent is polyoxyethylene sorbitan monostearate in which the polyoxyethylene has a maximum molecular weight of about 400.

References Cited in the file of this patent

UNITED STATES PATENTS

| | | |
|---|---|---|
| 2,411,105 | Nixon et al. | Nov. 12, 1946 |
| 2,497,150 | Carlson et al. | Feb. 14, 1950 |